United States Patent
Popescu

(10) Patent No.: US 8,624,567 B2
(45) Date of Patent: Jan. 7, 2014

(54) CONTROLLERS FOR DC/DC CONVERTERS

(75) Inventor: Serban Mihai Popescu, San Carlos, CA (US)

(73) Assignee: O2Micro, Inc., Santa Clara, CA (US)

( * ) Notice: Subject to any disclaimer, the term of this patent is extended or adjusted under 35 U.S.C. 154(b) by 162 days.

(21) Appl. No.: 13/341,300

(22) Filed: Dec. 30, 2011

(65) Prior Publication Data

US 2013/0169254 A1   Jul. 4, 2013

(51) Int. Cl.
*G05F 1/577* (2006.01)
*G05F 1/40* (2006.01)

(52) U.S. Cl.
USPC .......................... 323/267; 323/268; 323/283

(58) Field of Classification Search
USPC ................. 323/265, 267, 268, 272, 282–285
See application file for complete search history.

(56) References Cited

U.S. PATENT DOCUMENTS

| | | | | |
|---|---|---|---|---|
| 6,424,128 | B1 * | 7/2002 | Hiraki et al. | 323/268 |
| 6,667,603 | B2 * | 12/2003 | Hiraki et al. | 323/268 |
| 7,253,596 | B2 * | 8/2007 | Yamamoto et al. | 323/281 |
| 7,493,504 | B2 * | 2/2009 | Chapuis | 713/300 |
| 8,294,299 | B2 * | 10/2012 | Huang et al. | 307/75 |

* cited by examiner

*Primary Examiner* — Adolf Berhane

(57) ABSTRACT

A controller for a DC/DC converter includes multiple signal generators and a control circuit. The signal generators generate multiple pulse signals, each signal generator generating a corresponding pulse signal of the pulse signals and controlling the corresponding pulse signal to have a predetermined pulse width by counting a same preset number of cycles of a same oscillating signal. The control circuit selectively activates the signal generators according to an output of the DC/DC converter to generate the pulse signals.

18 Claims, 8 Drawing Sheets

CONTROLLERS FOR DC/DC CONVERTERS

BACKGROUND

DC to DC (or DC/DC) converters are used to convert input DC (direct current) voltages to output DC voltages. Such converters may step down (buck) or step up (boost) the input DC voltages. The converter typically has a controller, a driver, a pair of switches, and an LC filter coupled to the pair of switches. The controller provides a control signal to the driver which then drives the pair of switches, e.g., a high-side switch and a low-side switch. The driver alternately turns each switch on and off thereby controlling the inductor current and the output voltage of the DC/DC converter. The controller typically utilizes a pulse-width modulation (PWM) signal to control the state of the high-side and low-side switches.

FIG. 1 shows a schematic diagram of a conventional DC/DC converter using multiple controllers $102\_1$-$102\_N$. As illustrated in FIG. 1, multiple PWM signals are generated to control the states of several sets of switches (e.g., switches $S_{11}$ and $S_{12}$, switches $S_{21}$ and $S_{22}$, ..., and switches $S_{N1}$ and $S_{N2}$), and each set of switches includes a high-side switch (e.g., the switch $S_{11}$-$S_{N1}$) and a low-side switch (e.g., the switch $S_{12}$-$S_{N2}$). Taking the controller $102\_1$ for example, if the PWM signal generated by the controller $102\_1$ is logic high, the high-side switch $S_{11}$ is on and the low-side switch $S_{12}$ is off. Thus, the inductor $L_1$ is coupled to the input voltage source $V_{IN}$, and the inductor current begins to ramp up. If the PWM signal is logic low, the high-side switch $S_{11}$ is off and the low-side switch $S_{12}$ is on. Thus, the inductor $L_1$ is coupled to ground, and the inductor current begins to ramp down. Hence, the controller $102\_1$ can control the inductor current by controlling the duty cycle of the PWM signal.

In FIG. 1, currents flowing through the inductors $L_1$-$L_N$ are controlled by controllers $102\_1$-$102\_N$, respectively. More specifically, each controller $102\_1$-$102\_N$ receives a sense signal indicative of a corresponding inductor current from a corresponding sense resistor $R_1$-$R_N$. Each controller $102\_1$-$102\_N$ includes a comparator to compare the sense signal with a reference level, and controls the duty cycle of the PWM signal according to the comparison. In order to balance the inductor currents respectively flowing through the inductors $L_1$-$L_N$, the pulse widths of the PWM signals are required to be identical. However, due to non-ideality of analog circuits, e.g., the sense resistors $R_1$-$R_N$, comparators in the controllers $102\_1$-$102\_N$, etc., the controllers $102\_1$-$102\_N$ may not be able to control the pulse widths of the PWM signals to be identical.

Accordingly, there is a need in the art for DC/DC converters that better control pulse width for each of the generated PWM signals.

SUMMARY

In one embodiment, a controller for a DC/DC converter includes multiple signal generators and a control circuit coupled to the signal generators. The signal generators generate multiple pulse signals, each signal generator generating a corresponding pulse signal of the pulse signals and controlling the corresponding pulse signal to have a predetermined pulse width by counting a same preset number of cycles of a same oscillating signal. The control circuit selectively activates the signal generators according to an output of the DC/DC converter to generate the pulse signals.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments according to the present invention provide controllers for controlling DC/DC converters. The controller can provide multiple pulse-width modulation signals to control an output of the DC/DC converter. Advantageously, a controller of the present invention can control the pulse-width modulation signals to have the same pulse width.

Figure 2:
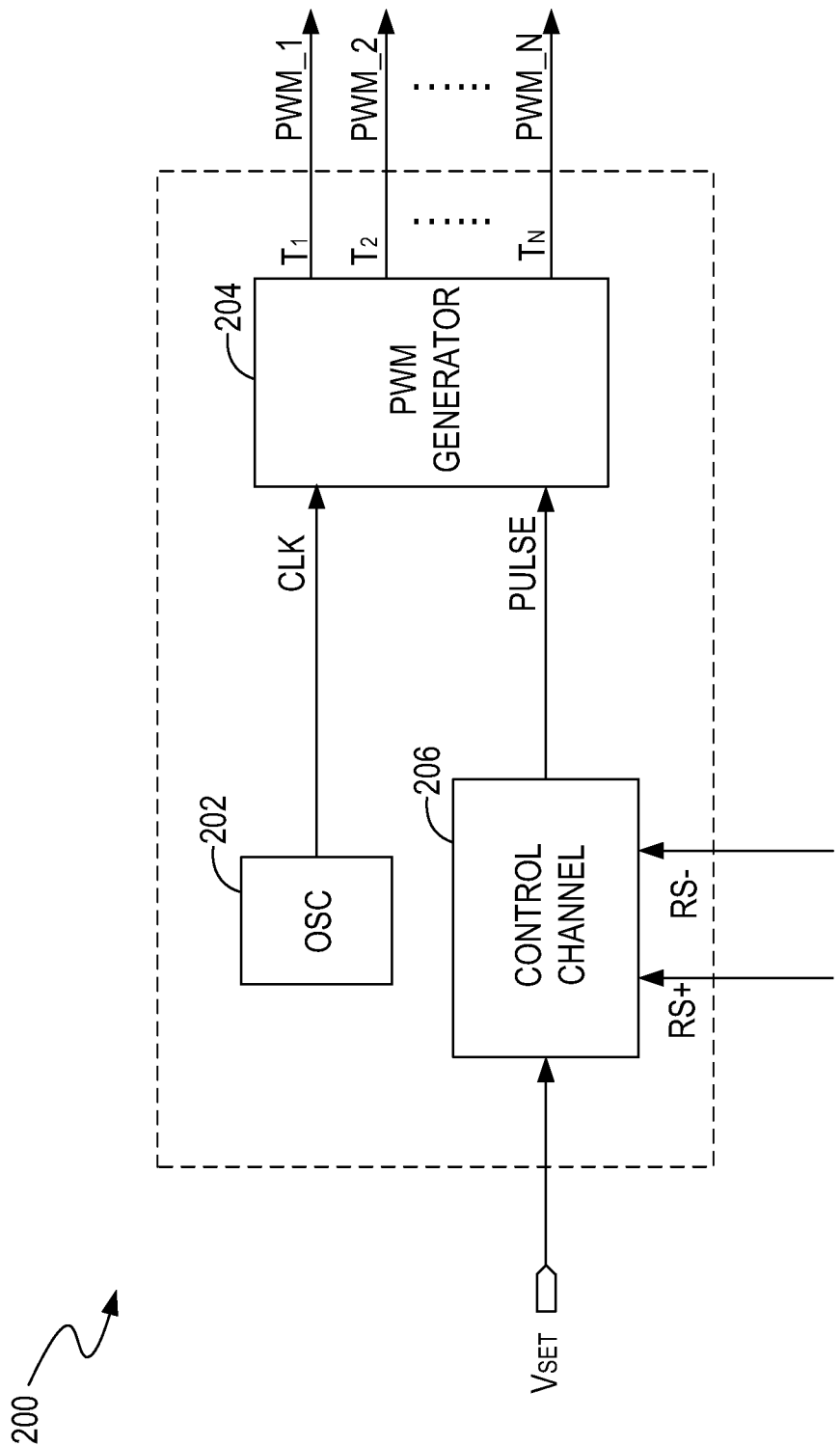
FIG. 2 illustrates a block diagram of an example of a controller for use with a DC/DC converter in accordance with one embodiment of the present invention.

FIG. 2 illustrates a block diagram of an example of a controller 200 for use with a DC/DC converter in accordance with one embodiment of the present invention. The controller 200 includes a set of control terminals $T_1, T_2, \ldots$, and $T_N$, each providing a respective pulse signal, e.g., PWM signals PWM_1-PWM_N (N is a natural number and $N \geq 1$), as shown in FIG. 2, according to an output, e.g., an output voltage or an output current, of the DC/DC converter. By way of example, a differential signal based on feedback signals RS+ and RS− shown in FIG. 2 is indicative of an output voltage $V_{OUT}$ of the DC/DC converter. The controller 200 can control the PWM signals PWM_1-PWM_N according to the feedback signals RS+ and RS−, to control the output voltage $V_{OUT}$ of the DC/DC converter.

More specifically, in one embodiment, the controller 200 includes a PWM generator 204, an oscillator 202, and a control channel 206, which can be integrated inside the controller 200 as shown in FIG. 2. In another embodiment of the present invention, the oscillator 202 and the control channel 206 can be placed outside the controller 200. The oscillator 202 generates a first oscillating signal CLK, e.g., a clock signal. The control channel 206 generates an index signal PULSE according to both a reference voltage $V_{SET}$ and a signal which is representative of the output voltage $V_{OUT}$ of the DC/DC converter, e.g., the differential signal based on the feedback signals RS+ and RS−. The PWM generator 204, which is coupled to the oscillator 202 and the control channel 206, generates multiple PWM signals PWM_1-PWM_N according to both a first oscillating signal CLK provided from the oscillator 202 and an index signal PULSE provided from the control channel 206. The index signal PULSE is representative of the output of the DC/DC converter.

Advantageously, the PWM generator 204 can control the PWM signals PWM_1-PWM_N based on the first oscillating signal CLK, such that the PWM signals PWM_1-PWM_N have substantially the same pulse width. As used herein, "substantially the same pulse width" means the pulse widths of the PWM signals PWM_1-PWM_N can have differences caused by, e.g., non-ideality of circuit components, so long as the differences are within a range that can be neglected. The PWM generator 204 can also control the PWM signals PWM_1-PWM_N based on the index signal PULSE, such that the output voltage $V_{OUT}$ of the DC/DC converter is adjusted to the level of the reference voltage $V_{SET}$. Further details are described below.

Figure 3:
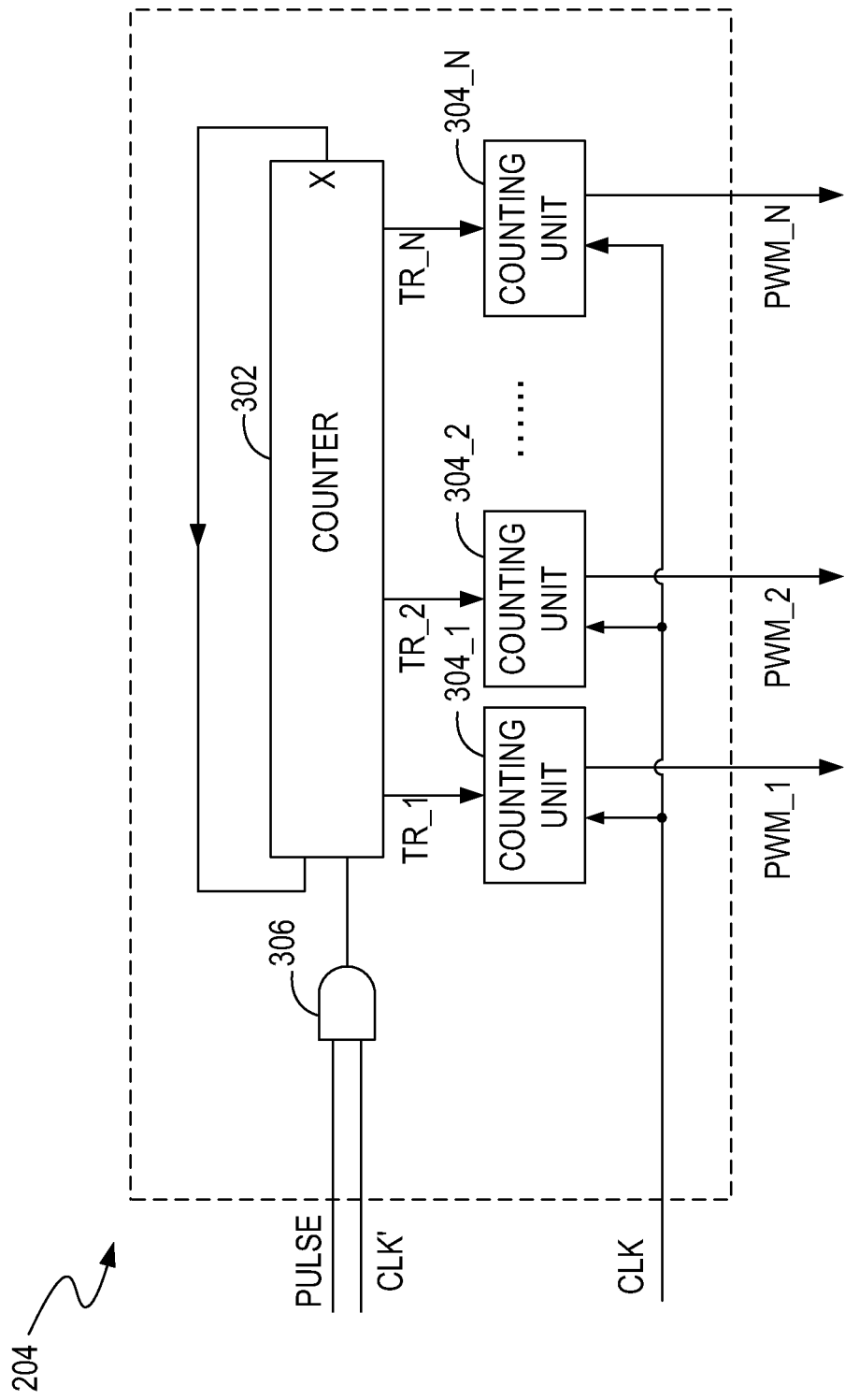
FIG. 3 illustrates a schematic diagram of an example of a PWM generator in accordance with one embodiment of the present invention.
Figure 4:
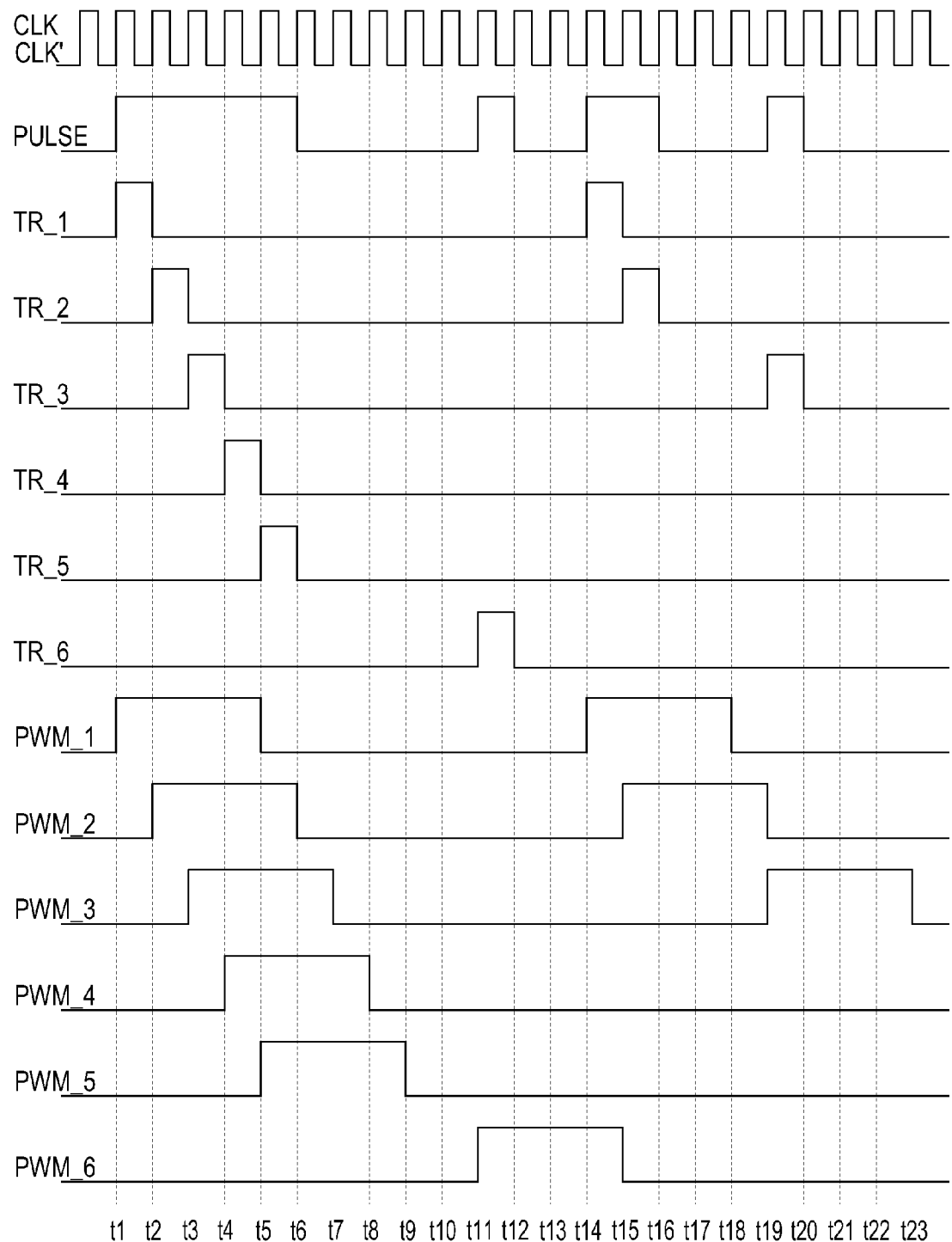
FIG. 4 illustrates examples of waveforms of PWM signals, trigger signals, an oscillating signal and an index signal PULSE in accordance with one embodiment of the present invention.

FIG. 3 illustrates a schematic diagram of an example of the PWM generator 204 shown in FIG. 2 in accordance with one embodiment of the present invention. FIG. 3 is described in combination with FIG. 2. The PWM generator 204 includes multiple signal generators and a control circuit coupled to the signal generators. In the example of FIG. 3, the control circuit includes a counter 302, and each signal generator includes a counting unit 304_1, 304_2, . . . , or 304_N. In one embodiment, the counter 302 can be a ring counter that includes a circular shift register; however, the present invention is not so limited. The signal generators, e.g., the counting units 304_1-304_N, are operable for generating pulse signals, e.g., the PWM signals PWM_1-PWM_N, respectively. As described below, the signal generators further control each pulse signal to have a predetermined pulse width by counting a same preset number of cycles of a same oscillating signal, e.g., the first oscillating signal CLK. The control circuit, e.g., the counter 302, selectively activates the signal generators according to both the index signal PULSE and a second oscillating signal CLK', e.g., a clock signal, to generate the pulse signals. Moreover, the counter 302 further controls the number of activated signal generators based on the duration of the index signal PULSE. For example, the signal generators including the counting units 304_1-304_N are activated selectively based on a logic AND result of the index signal PULSE and the second oscillating signal CLK'. To be more specific, in one embodiment of the present invention, one of the counting units 304_1, 304_2, . . . , and 304_N is selected and activated by the counter 302 when both the index signal PULSE and the second oscillating signal CLK' are logic high; also, while the index signal PULSE stays logic high, additional counting units from the counting units 304_1, 304_2, . . . , and 304_N are activated successively on the active edges of the second oscillating signal CLK'. As used herein, "activated successively" means a counting unit 304_1, 304_2, . . . , or 304_N is activated one by one in sequence. One or more counting units may be activated depending on the duration of the index signal PULSE. Further details are illustrated in FIG. 4 below. Moreover, as detailed in FIG. 5, the index signal PULSE is logic high when the output voltage $V_{OUT}$ of the DC/DC converter is less than a reference voltage $V_{SET}$, and is logic low when the output voltage $V_{OUT}$ of the DC/DC converter reaches or is greater than the reference voltage $V_{SET}$.

In one embodiment, when the index signal PULSE is logic high to indicate that the output voltage $V_{OUT}$ is less than the reference voltage $V_{SET}$, the counter 302 starts the activation of the counting units 304_1, 304_2, . . . , or 304_N. With reference to FIG. 3, an AND gate 306 receives the second oscillating signal CLK' and the index signal PULSE. In this embodiment, when the index signal PULSE is logic high, the waveform of the AND result signal is substantially the same as the second oscillating signal CLK'. In other words, the counter 302 starts to count on each active edge of the second oscillating signal CLK' when the index signal PULSE becomes logic high. A trigger signal TR_1, TR_2, . . . , or TR_N, e.g., a logic-high pulse, is generated from the counter 302 when the counter 302 counts according to one clock cycle of the second oscillating signal CLK'. By way of example, the counter 302 can increase a count value $CT_{302}$ by one in response to each cycle of the second oscillating signal CLK'. When the count value $CT_{302}$ reaches K (K is a natural number and 1≤K≤N), the counter 302 generates the trigger signal TR_K to the counting unit 304_K. If the index signal PULSE stays logic high long enough to span multiple clock cycles of the second oscillating signal CLK', then the count value $CT_{302}$ continues to increment and multiple trigger signals are generated successively. As used herein, "multiple trigger signals are generated successively" means the trigger signals are generated one by one in sequence, each in response to one corresponding clock pulse of the second oscillating signal CLK'. For example, on a first clock cycle of the second oscillating signal CLK' after the index signal PULSE becomes logic high, a trigger signal TR_K is generated; on a second clock cycle next to the first clock cycle if the index signal PULSE stays logic high, a trigger signal TR_(K+1) is generated; and on a third clock cycle next to the second clock cycle if the index signal PULSE stays logic high, a trigger signal TR_(K+2) (here, K≤(N−2)) is generated; and so on.

Furthermore, in one embodiment, the counter 302 can be set to have a start value $N_S$ and an end value $N_E$ ($N_S$ and $N_E$ are natural numbers and 1≤$N_S$≤$N_E$≤N). In one such embodiment, when the count value $CT_{302}$ of the counter 302 equals the end value $N_E$, the counter 302 generates a loop closure signal from a terminal X of the counter 302, and the loop closure signal then resets the counter 302 to $N_S$ instead of increasing the count value $CT_{302}$ by one.

Moreover, in one embodiment, the counter 302 includes a circular shift register (not shown in FIG. 3) controlled by both the second oscillating signal CLK' and the index signal PULSE as mentioned above. The circular shift register (e.g., an 8-bit register) has parallel outputs (e.g., trigger signals TR_1-TR_8). The circular shift register can be clocked according to the second oscillating signal CLK' based on the index signal PULSE, and can circularly shift a binary code (e.g., with initial register values of 10000000) accordingly. The circular shift register can cause the counter 302 to generate the trigger signals TR_1-TR_8, e.g., a number of logic-high pulses successively, in response to multiple clock cycles of the second oscillating signal CLK'.

Additionally, in one embodiment, the counting units 304_1-304_N are selectively activated by the trigger signals to successively generate multiple pulse signals. More specifically, in response to a trigger signal (e.g., TR_K) from the counter 302, a corresponding counting unit (e.g., 304_K) starts to count the first oscillating signal CLK, e.g., by counting the clock cycles of the first oscillating signal CLK, and generates a PWM signal (e.g., PWM_K) at a first level, e.g., logic high. A count value $CT_{304\_K}$ of the counting unit 304_K can increase by one in response to each clock cycle of the first oscillating signal CLK. When the count value $CT_{304\_K}$ obtained by counting the clock cycles of the first oscillating signal CLK equals a preset end value $CT_{PRE}$, the corresponding counting unit 304_K controls the corresponding PWM signal PWM_K to have a second level (e.g., logic low). Consequently, the counting unit 304_K controls the PWM signal PWM_K to have a predetermined pulse width that is equal to the preset end value $CT_{PRE}$ multiplied by the cycle period of the first oscillating signal CLK.

In other words, based on the second oscillating signal CLK' and the index signal PULSE, the counter 302 generates multiple trigger signals. In response to the trigger signals (e.g., from the trigger signals TR_1-TR_N), corresponding counting units (e.g., from the counting units 304_1-304_N) respectively start to count the first oscillating signal CLK and successively generate the corresponding PWM signals (e.g., from PWM signals PWM_1-PWM_N) at a first level. As each count value (e.g., from the count values $CT_{304\_1}$-$CT_{304\_N}$) obtained by counting the clock cycles of the first oscillating signal CLK equals the preset end value $CT_{PRE}$, the respective counting unit controls the corresponding PWM signals to have a second level. More specifically, in response to a first trigger signal, a first counting unit starts to count the first oscillating signal CLK and generates a first PWM signal at the first level, e.g., logic high. In response to a second trigger signal (the next trigger signal following the first trigger signal), a second counting unit also starts to count the first oscillating signal CLK and generates a second PWM signal at the first level, e.g., logic high. A third trigger signal (the next trigger signal following the second trigger signal) activates a third counting unit, and so on. When the count value from the first counting unit increases to a preset end value, e.g. $CT_{PRE}$, the first counting unit controls the first PWM signal to have the second level, e.g., logic low. The second, third, etc., counting units behave similarly when their respective counts reach the preset end value. Because each of the counting units 304_1, 304_2, . . . , and 304_N counts the same oscillating signal, e.g., the first oscillating signal CLK, to the same value, e.g., the preset end value $CT_{PRE}$ as mentioned above, the PWM signals PWM_1-PWM_N generated by the counting units 304_1-304_N can have substantially the same pulse width.

In an embodiment of the present invention, the second oscillating signal CLK' and the first oscillating signal CLK are the same signal, both generated from the same oscillator, e.g., the oscillator 202 in FIG. 2. However, in another embodiment, the first and second oscillating signals CLK and CLK' are different signals. In one such embodiment, the frequency of the second oscillating signal CLK' can be a submultiple of the frequency of the first oscillating signal CLK, and the active edge of the first oscillating signal CLK will always substantially coincide with the active edge of the second oscillating signal CLK'. Here, "substantially coincide" means the active edge of the first oscillating signal CLK and the second oscillating signal CLK' can have a slight delay with each other caused by, e.g., non-ideality of circuit components, as long as the delay is within a range that can be neglected.

As illustrated in FIG. 3, the AND gate 306 provides the logic AND result of the second oscillating signal CLK' and the index signal PULSE to the counter 302. For example, when the index signal PULSE is logic low, the counter 302 receives a logic low signal and the activation of the signal generators is halted; thus, the generation of the pulse signals is halted. When the index signal PULSE is logic high, the counter 302 receives a signal substantially the same as the second oscillating signal CLK' and starts counting to generate trigger signals accordingly. When the index signal PULSE stays logic high, the counter 302 receives a number $M_{CLK}$ ($M_{CLK}$ is a natural number, where in $M_{CLK} \geq 1$) of successive pulses, each substantially the same as one clock pulse of the second oscillating signal CLK', and the counter 302 generates the number $M_{CLK}$ of trigger signals. Accordingly, corresponding counting units of the counting units 304_1-304_N are activated by the generated trigger signals to successively generate multiple pulse signals. The number of generated pulse signals equals the number of the activated counting units, which equals the number of the generated trigger signals, e.g., $M_{CLK}$. The number $M_{CLK}$ of the successively generated pulse signals is determined by the index signal PULSE. By way of example, when the index signal PULSE is logic high, the number of successive pulses received by the counter 302 increases; thus, by counting accordingly, the counter 302 increases the number of the generated trigger signals and the number of the successively generated pulse signals, e.g., $M_{CLK}$. Moreover, as detailed in FIG. 6, the DC/DC converter can increase the output voltage $V_{OUT}$ by increasing the number $M_{CLK}$ of successively generated pulse signals, or decrease the output voltage $V_{OUT}$ by halting the generation of the pulse signals. As a result, the output voltage $V_{OUT}$ of the DC/DC converter can be adjusted to the reference voltage $V_{SET}$.

Figure 1:
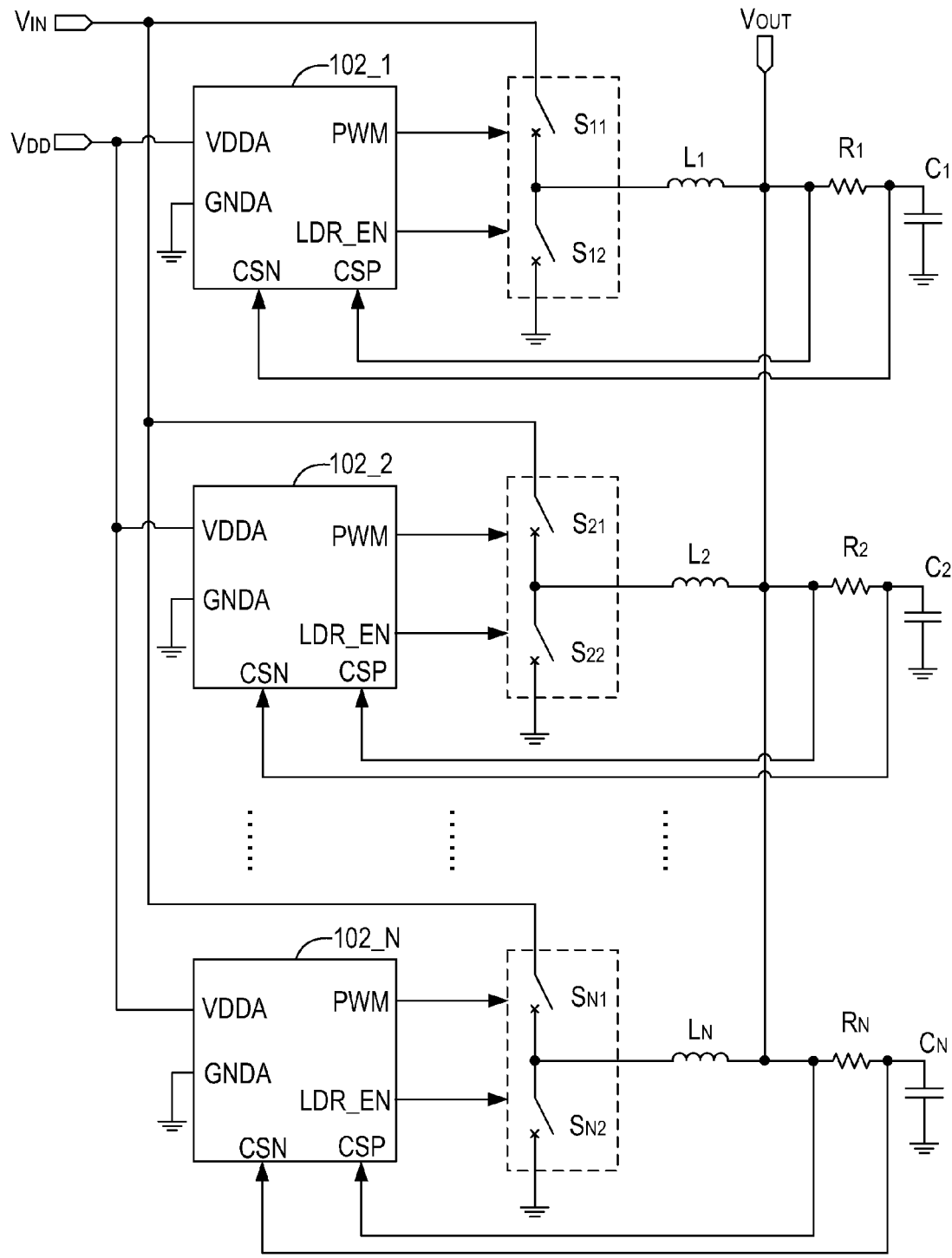
FIG. 1 shows a schematic diagram of a conventional DC/DC converter.

In operation, in one embodiment, if the index signal PULSE is logic low, the counter 302 receives a logic-low input signal and therefore the count value $CT_{302}$ of the counter 302 is unchanged. If the index signal PULSE is logic high, the counter 302 receives one or more pulses, each substantially the same with one clock pulse of the second oscillating signal CLK', and the counter 302 increases the count value $CT_{302}$ accordingly. As the count value $CT_{302}$ of the counter 302 increases, a corresponding counting unit (e.g., one of the counting units 304_1-304_N) is activated to generate a corresponding pulse signal. For instance, on counting to K ($1 \leq K \leq N$), the counter 302 provides the trigger signal TR_K to activate the counting unit 304_K, which in response generates the PWM signal PWM_K at logic high and starts to count the first oscillating signal CLK. The counting unit 304_K further controls the PWM signal PWM_K to be logic low when the count value $CT_{304\_K}$ gained by counting the first oscillating signal CLK reaches the preset end value $CT_{PRE}$ mentioned above. Advantageously, all the pulses of the PWM signals PWM_1-PWM_N can be configured with identical pulse widths by having the counting units 304_1-304_N count the same preset number (e.g., the preset end value $CT_{PRE}$) of clock cycles of the oscillating signal, e.g., the first oscillating signal CLK. Furthermore, compared with the analog circuits (e.g., sense resistors and comparators) of the controllers in FIG. 1, the digital circuits (e.g., the counting units 304_1, 304_2, . . . , and 304_N in FIG. 3) in the present invention can control the pulse widths of the PWM signals more accurately.

FIG. 4 illustrates examples of waveforms of the PWM signals PWM_1-PWM_6 generated from the PWM generator 204 as shown in FIG. 2, in combination with the waveforms of the trigger signals TR_1-TR_6, the first oscillating signal CLK, and the index signal PULSE in accordance with one embodiment of the present invention. FIG. 4 is described in combination with FIG. 3. In the example of FIG. 4, the first and second oscillating signals CLK and CLK' are the same signal, the start value of the counter 302 is set to one, the end value of the counter 302 is set to six, and the preset end value $CT_{PRE}$ for each counting unit 304_1-304_6 is set to four.

As shown in FIG. 4, from time t1 to time t6, the index signal PULSE is logic high. As such, five pulses, each substantially the same as the clock pulse of the second oscillating signal CLK', are received at the counter 302, enabling the counter 302 to count from, e.g., one to five. Thus, five trigger signals, e.g., TR_1-TR_5, are consecutively generated by the counter 302 as shown. In response to the trigger signals TR_1-TR_5, the signals PWM_1-PWM_5 are set to logic high at, e.g., times t1, t2, t3, t4 and t5, respectively. In other words, the counting units 304_1-304_5 are activated to generate five pulse signals, e.g., the pulses of the signals PWM_1-PWM_5, in a successive way (a pulse signal per counting unit). Because the preset end value $CT_{PRE}$ is four in this example, each of the signals PWM_1-PWM_5 has a pulse width equal to four cycles of the first oscillating signal CLK. From time t6 and to time t11, the index signal PULSE is logic low, and therefore the counter 302 halts the counting of the second oscillating signal CLK' and the activation of the counting units. Similarly, from time t11 to t12, the index signal PULSE is logic high, and one pulse (e.g., substantially the same with one clock pulse of the second oscillating signal CLK') is received at the counter 302. By time t6, the count value $CT_{302}$ of the counter 302 has reached five, so that the counter 302 will count to six at time t11. Thus, at time t11, the trigger signal TR_6 is provided from the counter 302 to activate the counting unit 304_6 to generate a pulse signal, e.g., a pulse of the signal PWM_6. By time t12, the count value $CT_{302}$ has reached six, which is the end value configured for the counter 302 in this example, and so the counter 302 is reset by the loop closure signal and the count value $CT_{302}$ is reset to zero. At times t12 through t14, the index signal PULSE is logic low, and therefore the counter 302 halts the counting and the generation of the trigger signals. From time t14 to time t16, the index signal PULSE becomes logic high again, and the counter 302 starts counting from one. Similarly, two trigger signals TR_1 and TR_2 are generated to set the signals PWM_1 and PWM_2 to logic high again at times t14 and t15, respectively. The process continues on in this manner.

Moreover, when the index signal PULSE is logic high, the number $M_{CLK}$ of the successively generated pulse signals increases. When the index signal PULSE is logic low, the generation of the pulse signals is halted and the number $M_{CLK}$ is reset to an initial value, e.g., zero. Taking FIG. 4 for example, from time t1 to time t6, the index signal PULSE is logic high and the number $M_{CLK}$ increases from zero to five. From time t6 to time t11, the index signal PULSE is logic low and no new pulse signal is generated, resetting the number $M_{CLK}$ to zero.

Furthermore, as shown in FIG. 4, the PWM signals PWM_1-PWM_6 have identical pulse widths. By way of example, upon the counting unit 304_1 being activated by the trigger signal TR_1 at time t1, the counting unit 304_1 starts to count the first oscillating signal CLK. When the count value $CT_{304\_1}$ obtained by counting the first oscillating signal CLK reaches a preset end value $CT_{PRE}$, which in this example is configured to be four as stated above, the counting unit 304_1 controls the pulse of the PWM signal PWM_1 to be logic low at time t5. Thus, the pulse of the PWM signal PWM_1 has a width of four clock cycles of the first oscillating signal CLK. Similarly, the pulses of the PWM signals PWM_2-PWM_6 are controlled to have the same width, which is also equal to four clock cycles of the first oscillating signal CLK.

Advantageously, as illustrated in FIG. 4, the PWM signals PWM_1-PWM_6 are generated and controlled based on the index signal PULSE, such that the output voltage $V_{OUT}$ of the DC/DC converter is adjusted to the level of the reference voltage $V_{SET}$. More details will be described below. Moreover, the PWM signals PWM_1-PWM_6 as shown in FIG. 4 have identical pulse widths.

Figure 5:
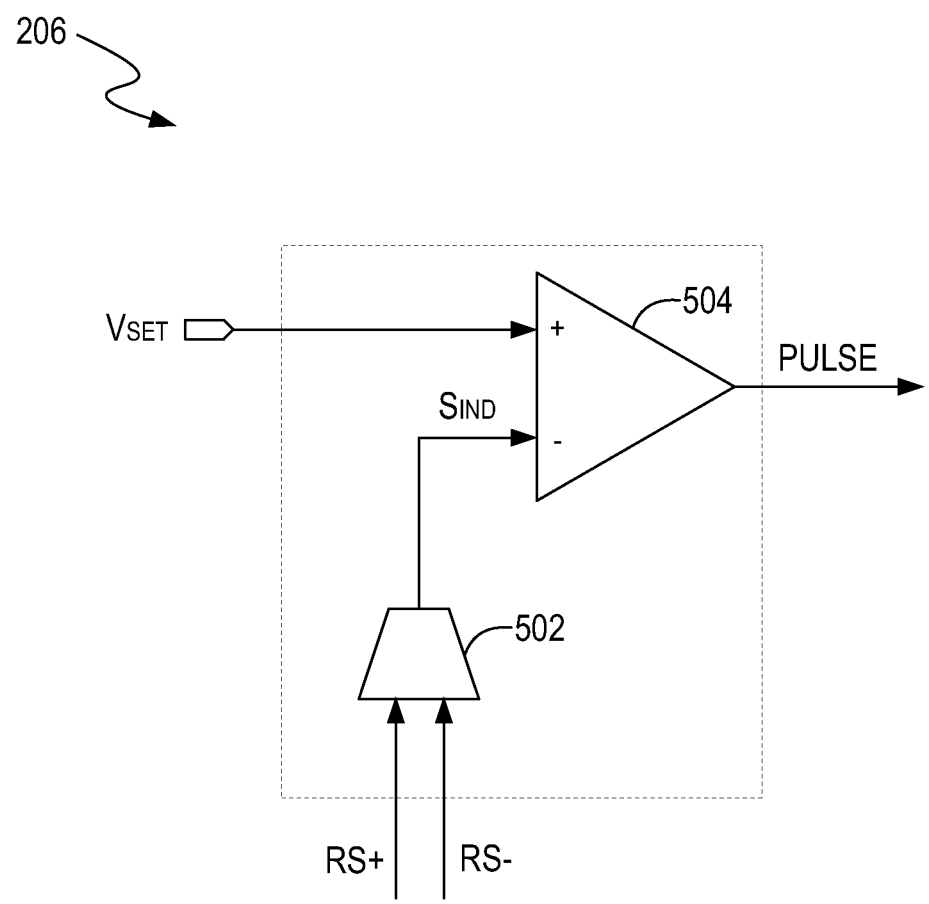
FIG. 5 illustrates a schematic diagram of an example of a control channel in accordance with one embodiment of the present invention.

FIG. 5 illustrates a schematic diagram of an example of the control channel 206 shown in FIG. 2 in accordance with one embodiment of the present invention. FIG. 5 is described in combination with FIG. 2 and FIG. 3. The control channel 206 includes a comparator 504 for comparing the output voltage $V_{OUT}$ of the DC/DC converter with the reference voltage $V_{SET}$ to generate the aforementioned index signal PULSE, so as to control the number $M_{CLK}$ of successively generated pulse signals. The comparator 504 can be any type of comparator, such as a clock comparator, etc. As shown in FIG. 5, the control channel 206 can further include a differential amplifier 502 for generating a signal which is indicative of the output of the DC/DC converter.

In the example of FIG. 5, the differential amplifier 502 receives feedback signals RS+ and RS− and provides a signal $S_{IND}$ to the comparator 504. The feedback signals RS+ and RS− can be a pair of differential signals whose difference is equal to the level of the output voltage $V_{OUT}$ of the DC/DC converter. The output signal $S_{IND}$ of the differential amplifier 502 can be linearly proportional to (e.g., equal to) the output voltage $V_{OUT}$. Thus, the comparator 504 can compare the reference voltage $V_{SET}$ with the output voltage $V_{OUT}$ by comparing the reference voltage $V_{SET}$ with the signal $S_{IND}$. In one embodiment, if the value of the signal $S_{IND}$ is greater than the value of the reference voltage $V_{SET}$, e.g., if the output voltage $V_{OUT}$ is greater than the reference voltage $V_{SET}$, then the output signal of the comparator 504, which is the index signal PULSE, is set to be logic low. If the value of the signal $S_{IND}$ is less than the value of the reference voltage $V_{SET}$, e.g., if the output voltage $V_{OUT}$ is less than the reference voltage $V_{SET}$, then the index signal PULSE is set to be logic high. As illustrated above, the index signal PULSE, when logic high, enables the counter 302 in FIG. 3 to start counting, which results in activating a set of counting units, e.g, the counting units 304_1-304_N, to generate a set of pulse signals.

In other words, in one embodiment, the control channel 206 determines whether a condition is satisfied; if the condition is satisfied, then a pulse signal PWM_K can be generated from an activated counting unit 304_K. If the reference voltage $V_{SET}$ together with the signal $S_{IND}$ indicate that the condition is satisfied, then the index signal PULSE is generated by the control channel 206 with logic high. In one embodiment, the condition is that the signal $S_{IND}$ is less than the reference voltage $V_{SET}$. When the index signal PULSE is logic high, the counter 302 is controlled to start counting and provide trigger signals to activate the corresponding counting units. The activated counting units generate corresponding pulse signals in response to the trigger signals. Consequently, the index signal PULSE that represents the output voltage $V_{OUT}$ of the DC/DC converter can be used to indicate when the number of pulse signals generated is to be increased.

Figure 6:
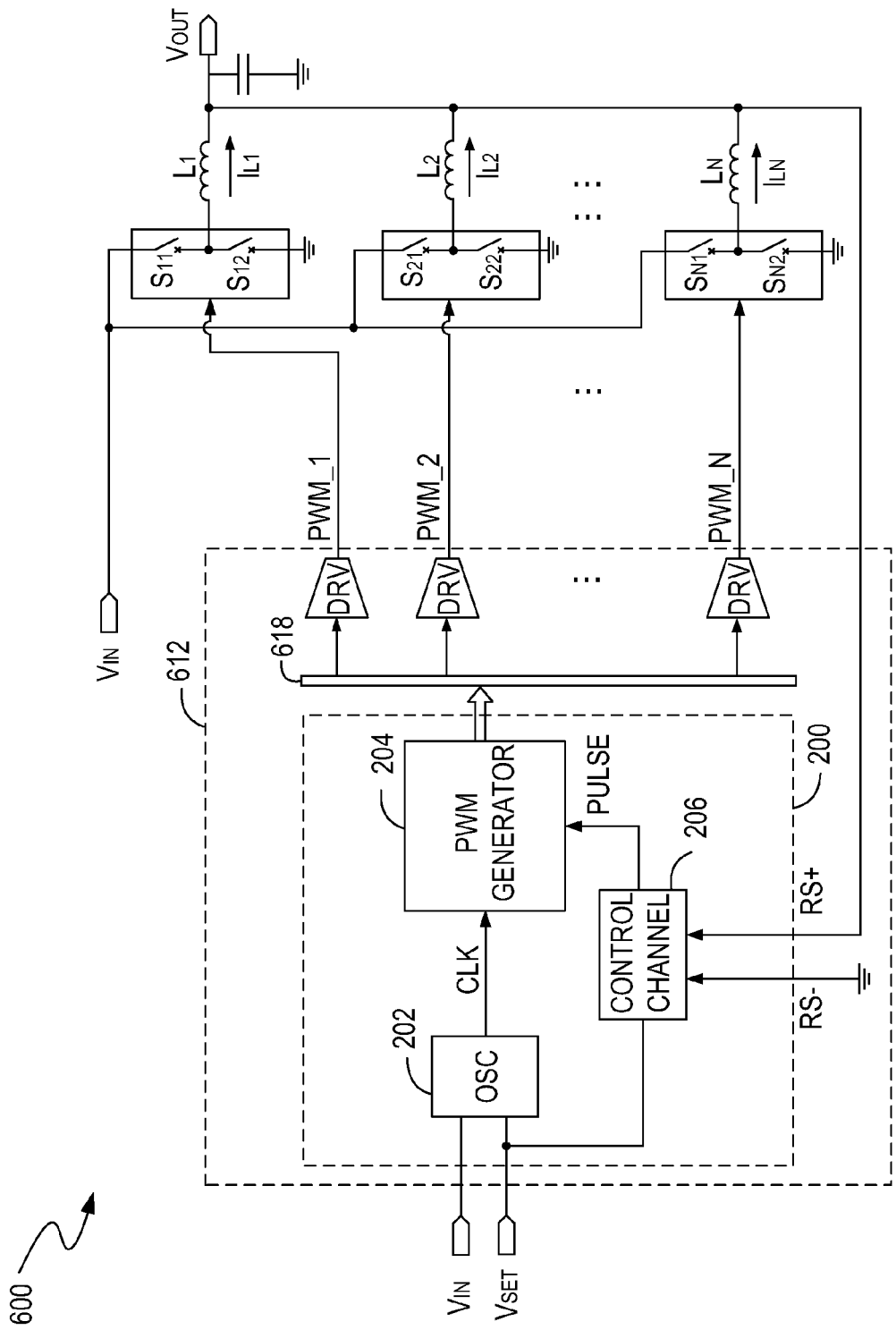
FIG. 6 illustrates a block diagram of an example of a DC/DC converter in accordance with one embodiment of the present invention.

FIG. 6 illustrates a block diagram of an example of a DC/DC converter 600 in accordance with one embodiment of the present invention. FIG. 6 is described in combination with FIG. 2, FIG. 3, FIG. 4 and FIG. 5. As shown in FIG. 6, the DC/DC converter 600 includes a controller 612, multiple sets of switches, e.g., switches $S_{11}$ and $S_{12}$, switches $S_{21}$ and $S_{22}$, ..., switches $S_{N1}$ and $S_{N2}$, and multiple inductors $L_1$-$L_N$. In the example of FIG. 6, the controller 612 includes controller 200, which includes the oscillator 202, the PWM generator 204, and the control channel 206 as described in FIG. 3.

In one embodiment, the control channel 206 generates a index signal PULSE according to both a reference voltage $V_{SET}$ and a signal which is representative of an output voltage $V_{OUT}$ of the DC/DC converter 600, e.g., the differential signal based on the feedback signals RS+ and RS−, and the PWM generator 204 generates a set of PWM signals PWM_1, PWM_2, ..., and PWM_N to control the output voltage $V_{OUT}$ of the DC/DC converter 600. More specifically, as shown in FIG. 6, the PWM generator 204 provides the set of PWM signals PWM_1-PWM_N to control the switches via a signal bus 618. If the signal PWM_1 is in a first state, e.g., logic high, the switch S11 is on and the switch S12 is off. Accordingly, the inductor $L_1$ is coupled to the input voltage source $V_{IN}$, and an inductor current $I_{L1}$ flowing through the inductor L1 increases. If the PWM signal is in a second state, e.g., logic low, the switch $S_{11}$ is off and the switch $S_{12}$ is on. Thus, the inductor $L_1$ is coupled to ground, and the inductor current $I_{L1}$ decreases. The inductor current $I_{L1}$ thus controls the output voltage $V_{OUT}$ of the DC/DC converter 600 accordingly. In one embodiment, the controller 200 can turn off the switches $S_{11}$ and $S_{12}$ when the inductor $L_1$ ramps down to zero. Thus, when a pulse of the signal PWM_1 occurs, the inductor current $I_{L1}$ is generated. The signals PWM_2-PWM_N can control inductor currents respectively flowing through the inductors $L_2$-$L_N$ in like manner.

As described in FIG. 3, the controller 200 can generate a set of pulses of the signals PWM_1-PWM_N. When the index signal PULSE stays logic high, the PWM generator 204 generates a number $M_{CLK}$ of pulses of the signals PWM_1-PWM_N. Thus, the number $M_{CLK}$ of the successively generated pulse signals is determined by the index signal PULSE; in other words, the controller 200 can control the number $M_{CLK}$ of the pulses according to the output voltage $V_{OUT}$. In one embodiment, the controller 200 increases the number $M_{CLK}$ of the pulses according to the output voltage $V_{OUT}$. More specifically, the controller 200 can increase the number $M_{CLK}$ if the output voltage $V_{OUT}$ is less than the reference voltage $V_{SET}$. The controller 200 can also halt the generation of the pulses if the output voltage $V_{OUT}$ reaches or is greater than the reference voltage $V_{SET}$. Accordingly, if the output voltage $V_{OUT}$ is less than the reference voltage $V_{SET}$, the controller 200 can increase the summation of the inductor currents of the inductors $L_1$-$L_N$ to increase the output voltage $V_{OUT}$. If the output voltage $V_{OUT}$ reaches or is greater than the reference voltage $V_{SET}$, the controller 200 can halt the generation of the inductor currents to decrease the output voltage $V_{OUT}$. Consequently, the output voltage $V_{OUT}$ can be adjusted to the reference voltage $V_{SET}$.

In one embodiment, the OSC 202 can control the frequency of the first oscillating signal CLK to be linearly proportional to a difference between the input voltage $V_{IN}$ and the reference voltage $V_{SET}$, e.g., the target level of the output voltage $V_{OUT}$. Additionally, according to the above description, the pulse widths of the PWM signals PWM_1-PWM_N can be linearly proportional to the cycle period of the first oscillating signal CLK. Thus, the pulse widths of the PWM signals PWM_1-PWM_N are inversely proportional to the difference between the input voltage $V_{IN}$ and the reference voltage $V_{SET}$. In this way, the inductor currents of the inductors $L_1$-$L_N$ are controlled to have constant ripple amplitudes $\Delta I$. Furthermore, the pulse widths of the PWM signals PWM_1-PWM_N can be identical, and therefore the inductor currents of the inductors $L_1$-$L_N$ can have substantially the same ripple amplitude $\Delta I$. As used herein "substantially the same ripple amplitude" means the ripple amplitudes for the inductor currents of the inductors $L_1$-$L_N$ can have differences caused by, e.g., non-ideality of circuit components, so long as the differences are within a range that can be neglected. Advantageously, the inductor currents of the inductors $L_1$-$L_N$ can have the same and constant ripple amplitude $\Delta I$. As a result, the inductor currents of the inductors $L_1$-$L_N$ are balanced with one another and the stability of the DC/DC converter 600 is enhanced.

In the example of FIG. 6, the PWM generator 204 provides the PWM signals PWM_1-PWM_N to control the output voltage $V_{OUT}$ of the DC/DC converter 600 via the signal bus 618. A start value of the counter in the PWM generator 204, e.g., the counter 302 in FIG. 3, is set to be one, and an end value of the counter in the PWM generator 204 is set to be N.

Figure 7:
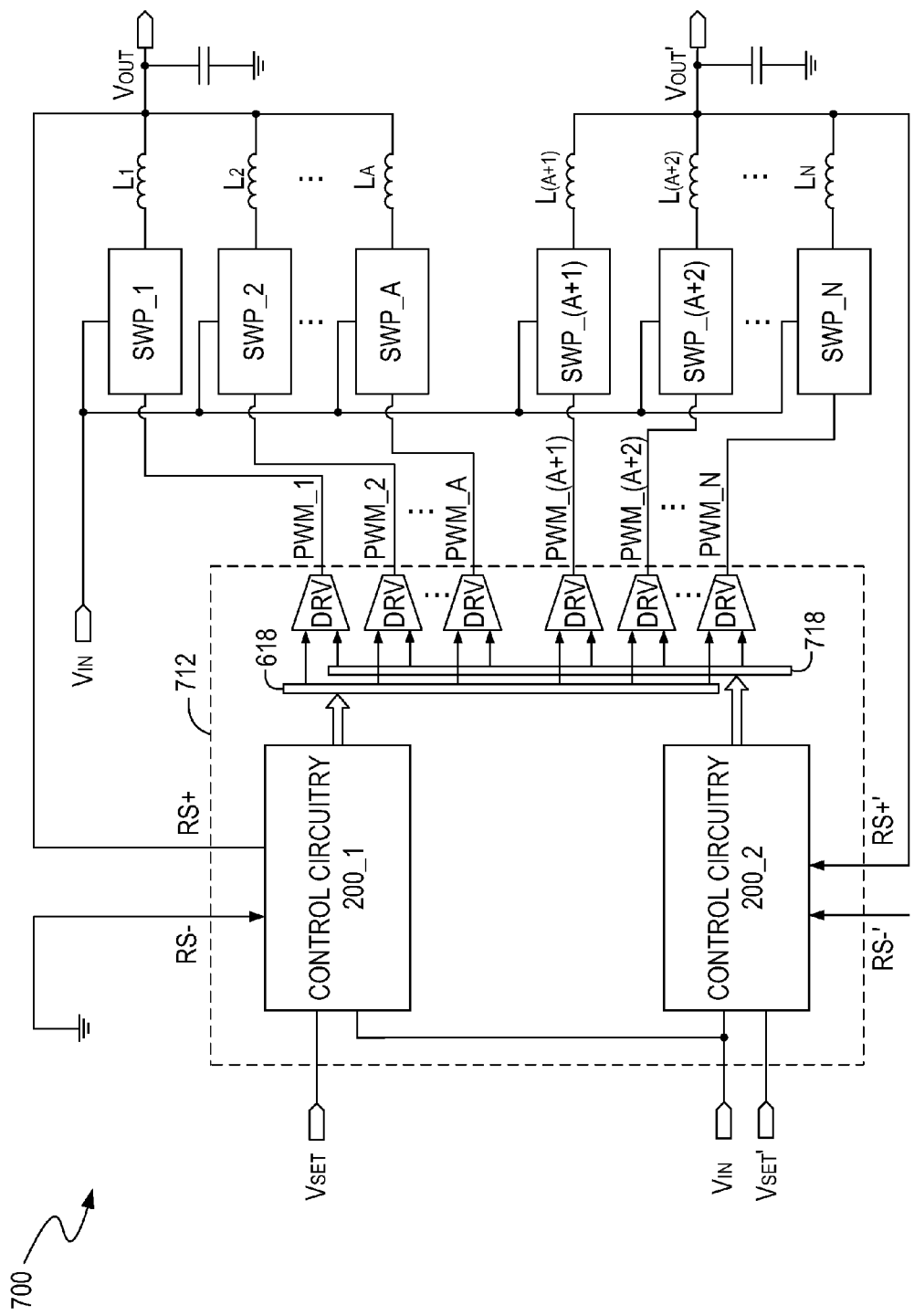
FIG. 7 illustrates a block diagram of an example of a DC/DC converter in accordance with another embodiment of the present invention.

FIG. 7 illustrates a block diagram of an example of a DC/DC converter 700 in accordance with one embodiment of the present invention. FIG. 7 is described in combination with FIG. 2, FIG. 3, FIG. 4, FIG. 5 and FIG. 6. As shown in FIG. 7, the DC/DC converter 700 includes a controller 712, multiple switch pairs SWP_1, SWP_2, ..., SWP_N, and multiple inductors $L_1$-$L_N$. Switch pairs SWP_1-SWP_N include similar structures to that of the switch pairs $S_{11}$ and $S_{12}$, $S_{21}$ and $S_{22}$, ..., and $S_{N1\ and\ SN2}$ shown in FIG. 6. In the example of FIG. 7, the controller 712 includes two control circuitries 200_1 and 200_2. The control circuitry 200_1 generates a first PWM signal set [PWM_1, PWM_2, ..., and PWM_A] to control an output voltage $V_{OUT}$ of the DC/DC converter 600 (A≤N) via the signal bus 618. The control circuitry 200_2 generates a second PWM signal set [PWM_(A+1), PWM_(A+2), ..., and PWM_N] to control another output voltage $V_{OUT'}$ of the DC/DC converter 600 via a signal bus 718, in a similar manner. The configurations of the control circuitry 200_1 and 200_2 in FIG. 7 are each similar to the configuration of the controller 200 in FIG. 6.

According to the above description of FIG. 6, the pulse widths of the PWM signals PWM_1 to PWM_A can be inversely proportional to the difference between the input voltage $V_{IN}$ and the reference voltage $V_{SET}$, and the pulse widths of the PWM signals PWM_(A+1) to PWM_N can be inversely proportional to the difference between the input voltage $V_{IN}$ and the reference voltage $V_{SET'}$. The reference voltage $V_{SET'}$ indicates a reference level of the output voltage $V_{OUT'}$ of the DC/DC converter 600 such that the output voltage $V_{OUT'}$ is adjusted to the level of the reference voltage $V_{SET'}$. In this way, the inductor currents of the inductors $L_1$-$L_A$ are controlled to have constant ripple amplitudes $\Delta I$, and the inductor currents of the inductors $L_{(A+1)}$-$L_N$ are controlled to have constant ripple amplitudes $\Delta I'$. Additionally, as described above, the pulse widths of the PWM signals PWM_1 to PWM_A can be identical, and the pulse widths of the PWM signals PWM_(A+1) to PWM_N can be identical. As a result, the inductor currents of the inductors $L_1$-$L_A$ are balanced with one another, the inductor currents of the inductors $L_{(A+1)}$-$L_N$ are balanced with one another, and the stability of the DC/DC converter 700 is enhanced.

Furthermore, in the example of FIG. 7, a start value of the counter in the control circuitry 200_1, e.g., the counter 302 in FIG. 3, is set to be one, and an end value of the counter in the control circuitry 200_1 is set to be A. A start value of the counter in the control circuitry 200_2, e.g., also represented by the counter 302 in FIG. 3, is set to be (A+1), and an end value of the counter in the control circuitry 200_2 is set to be N. However, the invention is not so limited. In another embodiment, the start values and the end values for the control circuitry 200_1 and 200_2 can have other values as long as the control circuitry 200_1 and 200_2 do not simultaneously control the same PWM signal.

Although two control circuitries (e.g., 200_1 and 200_2) are disclosed in the DC/DC converter 700 in the example of FIG. 7, any number of control circuitries can be included in the DC/DC converter.

Figure 8:
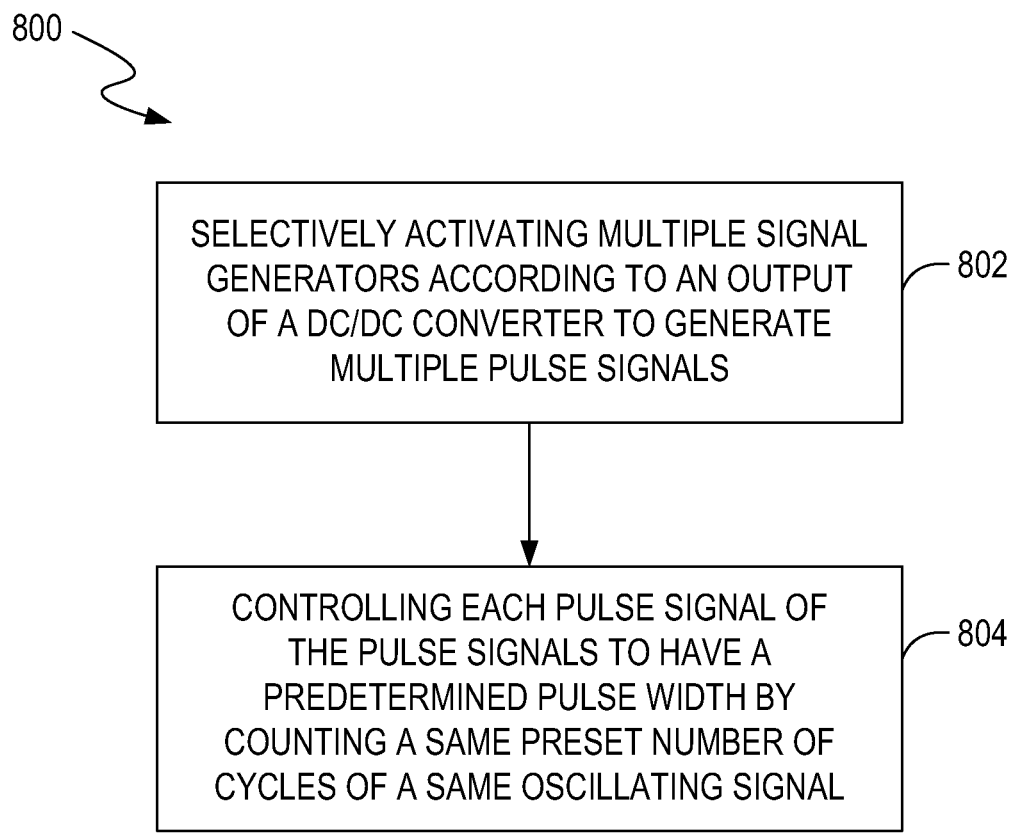
FIG. 8 illustrates a flowchart of examples of operations performed by a controller, in accordance with one embodiment of the present invention.

FIG. 8 illustrates a flowchart 800 of examples of operations performed by a controller, in accordance with one embodiment of the present invention. FIG. 8 is described in combination with FIG. 3, FIG. 5, FIG. 6 and FIG. 7.

In block 802, the controller (e.g., the controller 200 or the control circuitry 200_1 and 200_2) selectively activates a set of signal generators (e.g., the counting units 304_1-304_N) according to an output, e.g., an output voltage or an output current, of a DC/DC converter (e.g., converter 600 or 700), to generate a set of pulse signals (e.g., pulses of the PWM signals PWM_1-PWM_N).

In block 804, the signal generators (e.g., the counting units 304_1-304_N) control each pulse signal of the pulse signals to have a predetermined pulse width by counting a same preset number (e.g., the preset end value $CT_{PRE}$) of a same oscillating signal (e.g., the first oscillating signal CLK). Advantageously, the signal generators (e.g., the counting units 304_1-304_N) control the pulse signals to have substantially the same pulse width by multiplying the same preset number with a cycle period of the same oscillating signal.

In summary, embodiments according to the present invention provide controllers for DC/DC converters and methods for controlling the generation of multiple pulse signals. The controller for the DC/DC converter includes multiple signal generators to generate multiple PWM signals. By having the signal generators count the same oscillating signal to the same value, the PWM signals can have the same pulse width. The controller can be used in many applications such as multiphase DC/DC converters in GPUs (graphic processor units), CPUs (central processor units), VRs (voltage regulators), etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for a DC/DC converter, comprising:
   a plurality of signal generators that generates a plurality of pulse signals having a predetermined pulse width by counting cycles of a same first oscillating signal; and
   a control circuit, coupled to said signal generators, that selectively activates said signal generators according to an output of said DC/DC converter to generate said pulse signals,
   wherein each signal generator of said signal generators, in response to a trigger signal from said control circuit, starts to count said cycles of said same first oscillating signal and generates a corresponding pulse signal of said pulse signals at a first level, and wherein said each signal generator controls said corresponding pulse signal to have a second level when a count value obtained by counting said cycles of said same first oscillating signal equals a preset end value.

2. The controller as claimed in claim 1, wherein said predetermined pulse width is determined by multiplying said preset end value with a cycle period of said same first oscillating signal.

3. The controller as claimed in claim 1, wherein said signal generators control said pulse signals to have substantially the same pulse width by counting a same preset number of cycles of said same first oscillating signal.

4. The controller as claimed in claim 1, wherein said DC/DC converter comprises a plurality of switches and a plurality of inductors, and wherein each pulse signal of said pulse signals controls a pair of switches of said plurality of switches to control a current flowing through a corresponding inductor of said plurality of inductors.

5. The controller as claimed in claim 4, wherein said current increases if said each pulse signal is in a first state, and wherein said current decreases if said each pulse signal is in a second state.

6. The controller as claimed in claim 4, wherein said signal generators generate said pulse signals, by counting a same preset number of cycles of said same first oscillating signal, to control a plurality of currents flowing through said inductors to have substantially the same ripple amplitude.

7. The controller as claimed in claim 1, further comprising a comparator operable for comparing said output of said DC/DC converter with a reference level.

8. The controller as claimed in claim 7, wherein if said output is less than said reference level, then said control circuit increases said output by activating at least one signal generator of said signal generators one-by-one to generate at least one pulse signal, each of said at least one signal generator activated in response to a clock pulse of a second oscillating signal; and wherein if said output increases to said reference level, then said control circuit halts the activation of said signal generators.

9. The controller as claimed in claim 1, wherein said control circuit comprises a shift register that is controlled by a second oscillating signal and that causes said control circuit to generate, in response to a plurality of cycles of said second oscillating signal, a plurality of trigger signals to selectively activate said signal generators.

10. A method for controlling a DC/DC converter, comprising:
    selectively activating a plurality of signal generators according to an output of said DC/DC converter to generate a plurality of pulse signals; and
    controlling each pulse signal of said pulse signals to have a predetermined pulse width, said controlling comprising:
       controlling said each pulse signal to have a first level in response to a trigger signal;
       starting to count cycles of a same oscillating signal in response to said trigger signal; and
       controlling said each pulse signal to have a second level when a count value obtained by counting said cycles of said same oscillating signal equals a same preset end value.

11. The method as claimed in claim 10, wherein said selectively activating comprises:
    activating at least one signal generator of said signal generators one by one to generate at least one pulse signal if said output is less than a reference level, wherein each of said at least one signal generator is activated in response to a clock pulse of a clock signal; and halting the activation of said signal generators if said output increases to said reference level.

12. A controller for a DC/DC converter, comprising:
a plurality of terminals that provide a plurality of pulse signals; and
control circuitry that is coupled to said terminals and selectively activates a plurality of signal generators according to an output of said DC/DC converter to generate said pulse signals, and controls each pulse signal of said pulse signals to have a predetermined pulse width by counting cycles of a same oscillating signal, wherein each signal generator of said signal generators, in response to a trigger signal, starts to count said cycles of said same first oscillating signal and generates a corresponding pulse signal of said pulse signals at a first level, and wherein said each signal generator controls said corresponding pulse signal to have a second level when a count value obtained by counting said cycles of said same first oscillating signal equals a preset end value.

13. The controller as claimed in claim 12, wherein said predetermined pulse width is determined by multiplying said preset end value with a cycle period of said same oscillating signal.

14. The controller as claimed in claim 12, wherein said signal generators control said pulse signals to have substantially the same pulse width by counting a same preset number of cycles of said same oscillating signal.

15. The controller as claimed in claim 12, wherein said DC/DC converter comprises a plurality of switches and a plurality of inductors, and wherein said each pulse signal controls a pair of switches of said plurality of switches to control a current flowing through a corresponding inductor of said plurality of inductors.

16. The controller as claimed in claim 15, wherein said current increases if said each pulse signal is in a first state, and wherein said current decreases if said each pulse signal is in a second state.

17. The controller as claimed in claim 15, wherein said signal generators generate said pulse signals, by counting a same preset number of cycles of said same oscillating signal, to control a plurality of currents flowing through said inductors to have substantially the same ripple amplitude.

18. The controller as claimed in claim 12, wherein if said output is less than a reference level, then said control circuitry increases said output by activating at least one signal generator of said signal generators one-by-one to generate at least one pulse signal, each of said at least one signal generator activated in response to a clock pulse of a clock signal; and wherein if said output increases to said reference level, then said control circuitry halts the activation of said signal generators.

* * * * *